United States Patent
Hamlin et al.

(10) Patent No.: US 11,009,936 B2
(45) Date of Patent: May 18, 2021

(54) INFORMATION HANDLING SYSTEM POWER CONTROL SENSOR

(71) Applicant: Dell Products L.P., Round Rock, TX (US)

(72) Inventors: Daniel L. Hamlin, Round Rock, TX (US); Jace W. Files, Round Rock, TX (US); Preeth Kartikeyan Srinivasan, Round Rock, TX (US); John Trevor Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 278 days.

(21) Appl. No.: 16/401,705

(22) Filed: May 2, 2019

(65) Prior Publication Data

US 2020/0348745 A1 Nov. 5, 2020

(51) Int. Cl.
*G06F 1/3246* (2019.01)
*G06F 1/3206* (2019.01)
*G06F 1/16* (2006.01)
*G06F 3/01* (2006.01)

(52) U.S. Cl.
CPC .......... *G06F 1/3246* (2013.01); *G06F 1/1681* (2013.01); *G06F 1/1683* (2013.01); *G06F 1/3206* (2013.01); *G06F 3/017* (2013.01); *G06F 2203/04808* (2013.01)

(58) Field of Classification Search
CPC .... G06F 1/1616; G06F 1/1647; G06F 1/1681; G06F 1/1683; G06F 1/3206; G06F 1/3246; G06F 2203/04808; G06F 3/01
See application file for complete search history.

(56) References Cited

U.S. PATENT DOCUMENTS

| | | | |
|---|---|---|---|
| 5,396,351 A | 3/1995 | Gessel | |
| 5,553,296 A * | 9/1996 | Forrest | G06F 1/3209 |
| | | | 713/321 |
| 5,699,444 A | 12/1997 | Palm | |
| 5,825,436 A | 10/1998 | Knight | |
| 5,894,298 A | 4/1999 | Hoeksma | |
| 6,322,229 B1 | 11/2001 | Chan et al. | |
| 6,646,626 B1 | 11/2003 | Uskali et al. | |
| 7,301,532 B1 | 11/2007 | Dobry | |
| 7,430,003 B2 | 9/2008 | Nichols et al. | |
| 7,502,010 B2 | 3/2009 | Kirk | |
| 7,843,429 B2 | 11/2010 | Pryor | |

(Continued)

OTHER PUBLICATIONS

U.S. Appl. No. 16/107,748, entitled "Context Aware Secondary Screen UI on Dual Screen Productivity 2-in-1 Devices", filed Aug. 21, 2018, by Viswanathan et al.

*Primary Examiner* — Terrell S Johnson
(74) *Attorney, Agent, or Firm* — Zagorin Cave LLP; Robert W. Holland (57) ABSTRACT

An information handling system adapts a capacitive sensor from a primary function of an operational state to a secondary function of managing a power on command from a power off state to transition the information handling system to an operational state. For example, a touchscreen display or specific absorption rate sensor transitions to a low power state, such as with a reduced scan rate, when the information handling system is in a power off state and commands transition to a power on state in response to a touch that lasts a predetermined amount of time.

20 Claims, 5 Drawing Sheets

(56) References Cited

U.S. PATENT DOCUMENTS

| | | |
|---|---|---|
| 8,707,174 B2 | 4/2014 | Hinckley et al. |
| 9,395,762 B2 | 7/2016 | Sharma et al. |
| 9,524,139 B2 | 12/2016 | Aurongzeb et al. |
| 9,946,373 B2 | 4/2018 | Graf et al. |
| 10,204,592 B1 | 2/2019 | Trim et al. |
| 2006/0132447 A1 | 6/2006 | Conrad |
| 2011/0209039 A1 | 8/2011 | Hinckley et al. |
| 2012/0066591 A1 | 3/2012 | Hackwell |
| 2014/0029183 A1 | 1/2014 | Ashcraft et al. |
| 2014/0078116 A1 | 3/2014 | Mercea et al. |
| 2014/0362009 A1* | 12/2014 | Lin ................. G06F 1/3206 345/173 |
| 2016/0091678 A1* | 3/2016 | Qian ............... H04B 10/801 398/142 |
| 2018/0107373 A1* | 4/2018 | Cheng .............. G06F 3/041661 |
| 2019/0163432 A1 | 5/2019 | Files et al. |
| 2019/0278323 A1 | 9/2019 | Aurongzeb et al. |

\* cited by examiner

INFORMATION HANDLING SYSTEM POWER CONTROL SENSOR

BACKGROUND OF THE INVENTION

Field of the Invention

The present invention relates in general to the field of information handling system input devices, and more particularly to an information handling system power control sensor.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems come in a variety of form factors, including portable form factors adapted for mobile use. One goal of a portable information handling system is to integrate processing capabilities into thin and light weight housings so that end users can carry and use the systems while on the go. Tablet form factors typically have a planar housing that integrate processing components under a flat panel display having a touchscreen to provide input user interfaces, such as through a keyboard presented at the display. Convertible form factors typically have two rotationally-coupled planar housings that integrate a display in one housing and a keyboard in the other. Convertible information handling systems rotate from a closed configuration to a clamshell configuration in which a housing portion with a keyboard acts as a base that supports a housing portion with a display in a viewing position.

Generally, end users prefer that portable information handling systems have as thin and light weight of a form factor as possible for selected processing capabilities. Display screen size tends to drive housing width and length. To reduce height and length, displays should extend across as much of the housing perimeter as possible, which leaves minimal room for a power button or other types of input devices. Housing height tends to increase as processing capability increases since greater processing capability tends to generate increased thermal management and power supply needs. Low Z-height portable information handling systems tend to rely on passive thermal rejection and less powerful processing components to minimize vertical space associated with housing design. Low Z-height systems often integrate thinner keyboards to help reduce system height and, in more recently introduced systems, replace the keyboard with a touchscreen display. Such two display systems support typed inputs in a clamshell configuration, although end users tend to find typing at a touchscreen display to be less efficient than typing at a physical keyboard. Typically, portable information handling systems also include wireless transceivers so that end users can interact through peripheral keyboards, such as through Bluetooth.

Low Z-height information handling systems tend to limit ports that provide cable interfaces since such ports tend to increase system height. Often, portable information handling systems will rely on a single USB cable for external power and wireless communication for most external communications. For example, rather than including an Ethernet port, portable information handling systems tend to rely on wireless local area network (WLAN) communicates supported with a wireless network interface card (WNIC) integrated in the housing. WNIC's typically interface with plural antenna deployed across the portable housing so that wireless interface signals are sufficient in various system configurations. Because low Z-height systems tend to rely on metal housings for structural rigidity, antenna to support wireless communication are often integrated along a display bezel or in a hinge assembly that rotationally couples housing portions to each other. Usually, each antenna has a nearby proximity sensor that detects an end user's proximity to the antenna to ensure that radiofrequency transmissions do not exceed specific absorption rate (SAR) limits.

SUMMARY OF THE INVENTION

Therefore, a need has arisen for a system and method which integrates power control sensing at an information handling system housing with minimal footprint.

In accordance with the present invention, a system and method are provided which substantially reduce the disadvantages and problems associated with previous methods and systems for sensing power control inputs at an information handling system housing. A touch detection device having an operational function with an information handling system in an operational state is repurposed in a quiescent state to accept a power up command.

More specifically, an information handling system processes information with processing components disposed in a housing, such as processor and memory. The processing components interact with an end user by using capacitive touch detection devices, such as a touchscreen display that accepts inputs as touches and a wireless transceiver that manages transmission power with specific absorption rate (SAR) sensors disposed proximate antennae. Upon transitioning to a power down quiescent state, such as a state in which the processor powers off or stops executing instructions, one or more capacitive touch detection devices are repurposed to accept a power up transition command. For instance, a touchscreen display associates a number of fingers touching for a predetermined time period with a power up command. As another example, a SAR sensor associates a touch near an antenna for a predetermined time as a power up command. Upon detection of touches associated with a power up command, the touch detection device issues an interrupt or other GPIO signal to an embedded controller to transition the information handling system to an operational state.

The present invention provides a number of important technical advantages. One example of an important technical advantage is that an information handling system is commanded from an off state to an operational state without a dedicated power button. Repurpose of a touch detection device provides a power button functionality without adding a power button exposed at the housing. This reduces system cost and improves the robustness of the housing by eliminating an opening that weakens the housing structure and reduces access to contaminants at the housing interior. A low scan rate of the capacitive touch detection devices in the power switch mode minimizes power consumption when in the powered down state.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system capacitive detection device is repurposed from a primary function in an operational state to a power management function in power off state to act as a power switch. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
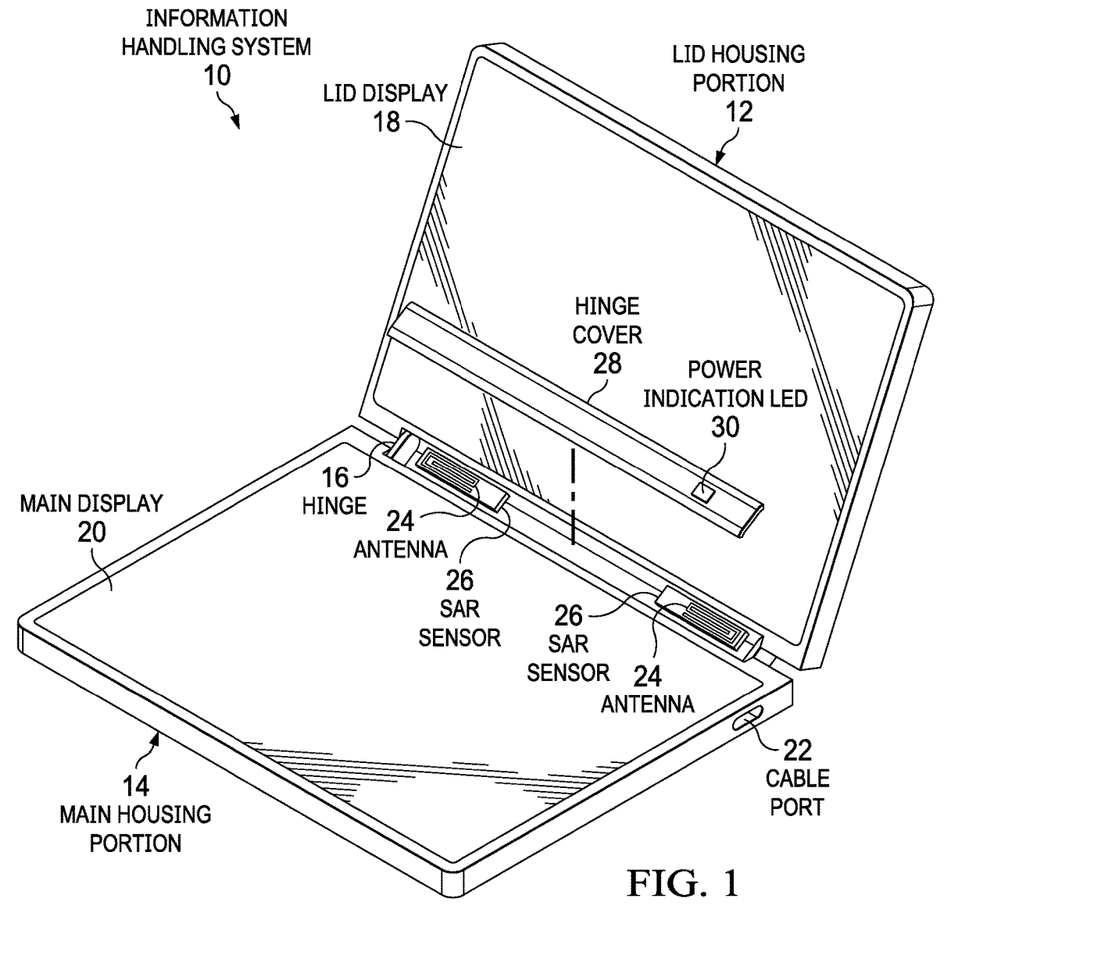
FIG. 1 depicts a side perspective view of a portable information handling system having a hinge assembly hinge cover exploded to illustrate a specific absorption rate sensor configurable for use as a power on command switch.

Referring now to FIG. 1, a side perspective view depicts a portable information handling system 10 having a hinge assembly hinge cover 28 exploded to illustrate a specific absorption rate (SAR) sensor 26 configurable for use as a power on command switch. Portable information handling system 10 is built into a portable housing having a lid housing portion 12 rotationally coupled to a main housing portion 14 by a hinge assembly 16. In the example embodiment, lid housing portion 12 integrates a touchscreen lid display 18 and main housing portion 14 integrates a main display 20. The example embodiment illustrates a dual display system in a clamshell configuration in which main display 20 rests on a horizontal surface to present a user interface that accepts end user inputs, such as a displayed keyboard that accepts typed inputs. Main housing portion 14 supports lid housing portion 12 in a vertical viewing position to show information as visual images at touchscreen lid display 18 aligned for viewing by an end user who is typing at main display 20. Since the housing portions in the example embodiment are essentially identical from an end user perspective, lid housing portion 12 may rest horizontally to support main housing portion 14 in a vertical viewing position without impacting the end user experience. In an alternative embodiment of the power management system described herein, information handling system 10 may use just one display in one housing portion and a keyboard in the other housing portion for a conventional convertible information handling system or may have other form factors, such as desktop form factor.

Information handling system 10 includes a single USB cable port 22 to accept a cable for information and power transfer. Although alternative embodiments may include additional ports, minimizing the number of ports helps to minimize housing size and maintain housing robustness. To enhance information communication without additional cables, a pair of antennae 24 are disposed on opposing sides of hinge assembly 16, such as to support a MIMO antenna configuration for wireless local area network (WLAN) and wireless wide area network (WWAN) communications. A specific absorption rate (SAR) sensor 26 is disposed proximate each antenna 22 to manage wireless signal transmission strength versus radiofrequency limitations defined by government agencies. For example, SAR sensors 26 detect proximity of human body parts by measuring changes in capacitance induced by near field effects. As a SAR sensor 26 detects proximity of a human body part, a transmitter interfaced with the nearby antenna 24 can reduce wireless signal transmission strength so that radiofrequency energy absorbed by the human body part remains within limits. Hinge cover 28 fits over hinge assembly 16 to hide antennae 24. In the example configuration, end user proximity to antennae 24 is most likely in the clamshell configuration when an end user holds information handling system 10 in his lap. In alternative embodiments, antenna may be placed in other locations that have different end user interaction likelihoods, such as in a display perimeter or at the back of a housing.

Information handling system 10 executes instructions with an integrated processor to accept end user inputs and present output as visual images. Typically, to turn off information handling system 10, an end user input to the operating system initiates a power down sequence that shuts down processing components. Conventional information handling systems typically include a power switch that accepts an end user press to bring the processing components back to an operational state in which the processor executes instructions. Generally, conventional information handling systems include a "soft" power switch that sends an interrupt to an embedded controller to wake the embedded controller from a quiescent state and initiate a power up sequence that applies power to other processing components. The embedded controller, typically the keyboard controller, uses very little power in the quiescent state as only minimal power dissipates through ground, however, the embedded controller can essentially eliminate power consumption by other processing components by cutting off power rails that supply power to the other processing components. Under the Advanced Configuration and Power Interface (ACPI) standard, an "S0" operational state has the processing components powered up and operational while "S1-S5" reduced power states have the system in non-operational states having different latencies to return to the operational S0 state. For instance, S3 defines an information handling system powered down with random access memory retaining executable code, S4 defines the executable code stored in a persistent storage device, and S5 defines a power down state from which the information handling system boots back to the S0 on state.

In the example embodiment, information handling system 10 awakens from the various low power quiescent states, such as S3, S4 and S5, by maintaining SAR sensor 26 operational to issue an interrupt to another processor of information handling system 10 if a touch is detected that lasts for a predetermined time period, such as four seconds. For instance, an end user places a finger on hinge cover 28 at the location of an antenna 24 so that SAR sensor 26 detects the proximity by the change in capacitance even though the wireless transceiver is powered off. After detecting the changed capacitance for the predetermined time, SAR sensor 26 illuminates a power indication LED 30 and issues an interrupt that initiates a power up sequence to bring information handling system 10 to an operational state, such as an interrupt to an embedded controller or a central processing unit. While information handling system 10 is powered down, SAR sensor 26 may reduce power consumption by applying a reduce scan rate of capacitance measurements, such as 10 Hz compared with 100 Hz for normal operations. In various embodiments, additional interactions may be added to the power up sequence to prevent inadvertent power ups. For example, once the power indication LED 30 illuminates, a swiping motion or other confirmation may be required to command power up. As another example, an end user may have to press a finger at both SAR sensors 26 simultaneously to command a power up.

Figure 2:
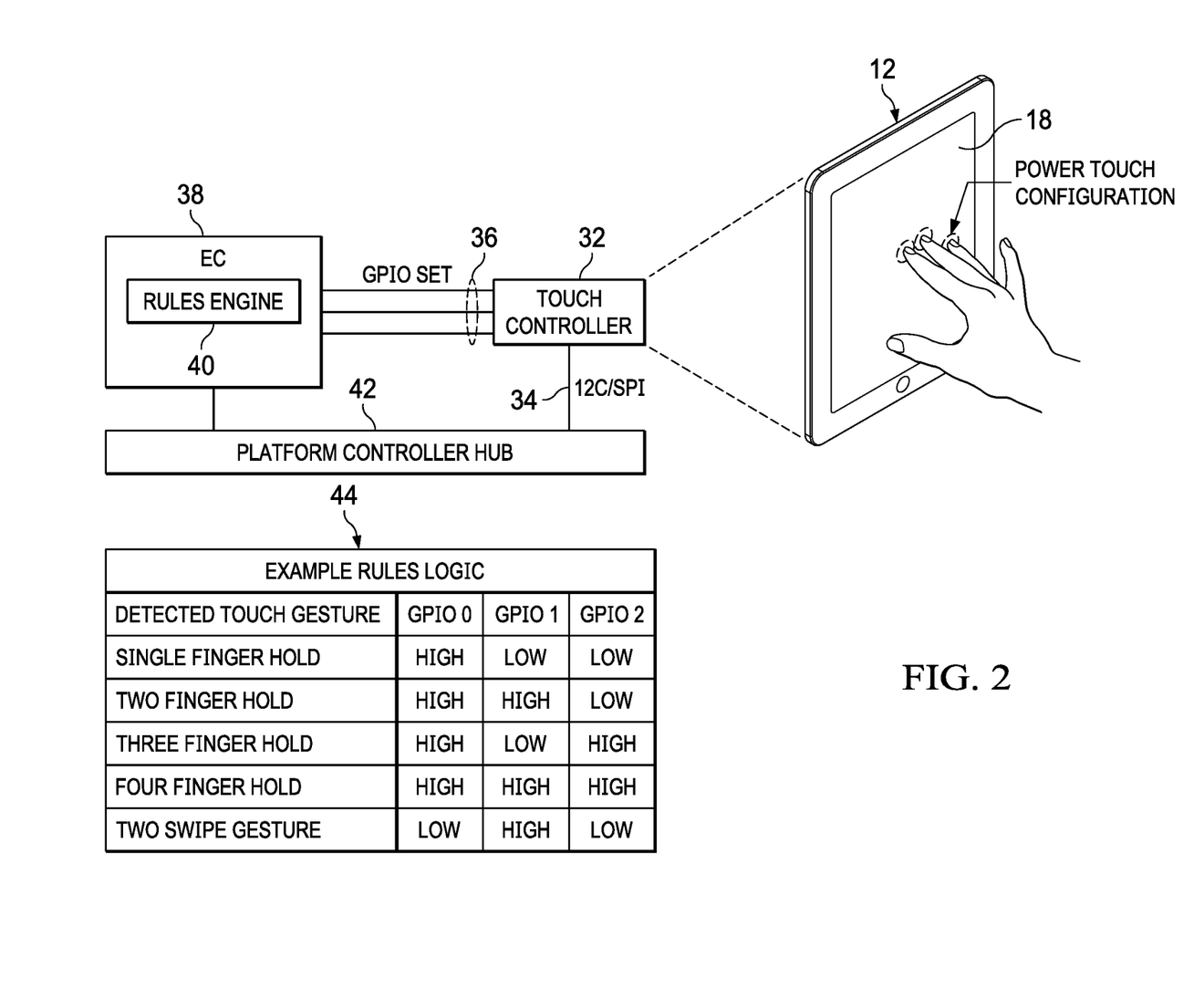
FIG. 2 depicts a block diagram of a power management system that repurposes a touchscreen display to provide a power on command when the processor is off.

Referring now to FIG. 2, a block diagram depicts a power management system that repurposes a touchscreen display to provide a power on command when the processor is off. Touchscreen lid display 18 presents visual images and detects touch positions relative to the visual images as a primary function when an information handling system is operational, such as when a processor is executing instructions of an operating system. Touch detection is managed with a touch controller 32, which scans capacitive sensing wires within touchscreen lid display 18 to locate a touch position, such as at an operational scan rate of 100 Hz. Touch controller 32 reports detected touches to an embedded controller 38 through GPIO interfaces 36 and to a controller hub 42 through a serial link 34, such as the Platform Controller Hub (PCH) 42 found in INTEL platform chipsets. Embedded controller 38 and controller hub 42 manage detected touches in an operational state in a conventional manner, such as reporting the touches to an operating system executing on the information handling system.

Once an information handling system enters a quiescent state in which touchscreen lid display 18 does not present visual information and the processor stops executing code, touch controller 32 repurposes touch detection of touchscreen lid display 18 to operate as a power switch that commands a system power up. In the example embodiment, three fingers are placed on touchscreen lid display 18 in the quiescent state. In response to detecting the three fingers for a predetermined time, such as four seconds, touch controller 32 sets all three GPIO interfaces of embedded controller 38 to a high state. A rules engine 40 executes in response to the inputs to command a transition to a different power state based upon the number of detected touch points. A rules logic table 44 provides an example for how different detected touches may impact transition from a quiescent to an operational state. For instance, embedded controller 38 might ignore one touch no matter how long it is detected, initiate a power up to a BIOS interface with two detected touches, and initiate a power up of the operating system to an operational state with three detected touches. As another example, the predetermined time of a touch detection may vary based upon the number of touches. For instance, with a two finger touch a transition to a power up state might start after four seconds while a three finger touch might transition to a power up state after two seconds. In another alternative embodiment, after a predetermined time touch controller 32 may increase the touch scan rate, such as from a low power rate of 10 HZ to a full rate of 100 HZ, so that a power up is commanded with detection of a swipe across touchscreen display. To provide the end user with feedback that a power up is available, touchscreen display may present a visual image of the swipe direction after a touch is detected for a predetermined time period.

Figure 3:
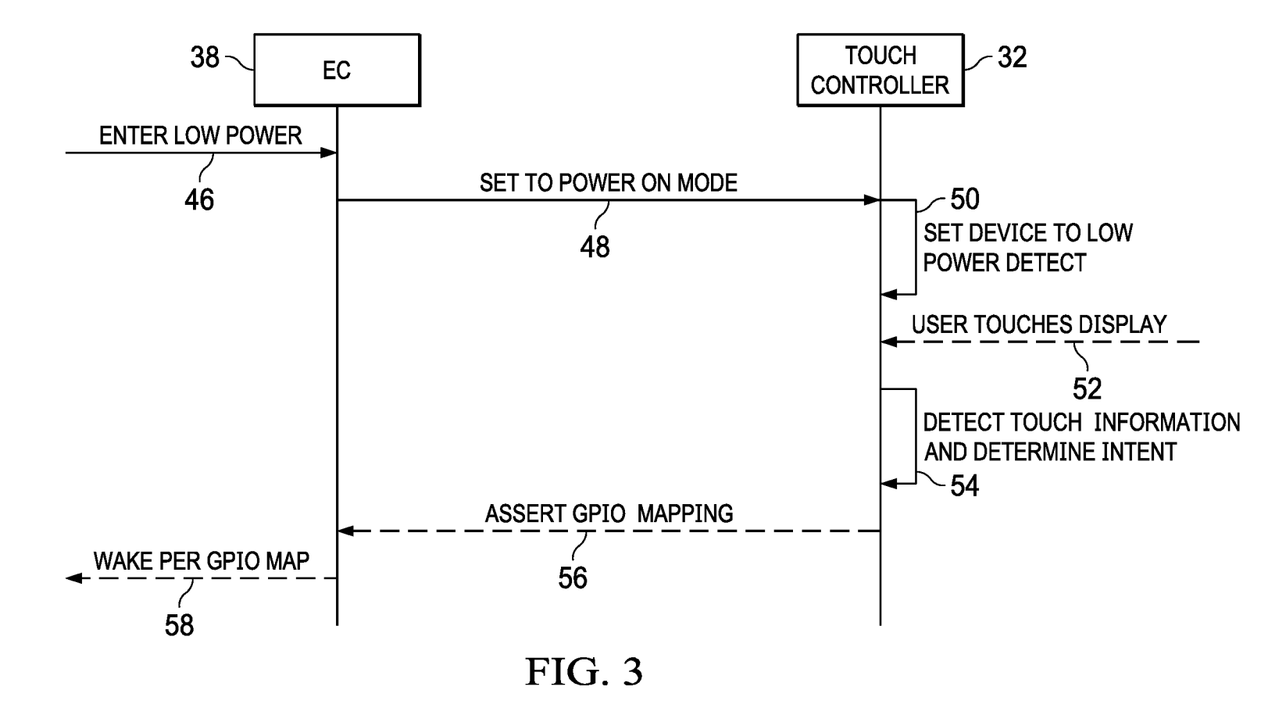
FIG. 3 depicts a flow diagram of a process for power management through a repurposed touch detection device.

Referring now to FIG. 3, a flow diagram depicts a process for power management through a repurposed touch detection device. The process starts at step 46 with a transition to a low power quiescent state, such as with the processor in a sleep mode and not executing code. At step 48, the embedded controller sets the capacitive touch detection device to a power on mode that detects a power on transition command instead of the primary function performed by the touch detection device. At step 50, the touch controller applies a low power detection mode, such as by reducing the scan rate of the touch controller for detecting touches. The touch controller remains in the low power mode until, at step 52, a user touch is detected at the touch detection device. At step 54 the touch is detected to determine the end user intent for the touch. The touch detection at step 54 may use a full power scan or may stay in the low power scan until the intent is determined. If an end user intent to power up the information handling system is detected, the process continues to step 56 to assert an interrupt through one or more GPIO pins, such as in accordance with a binary map that defines a wakeup action based upon the type of touch. At step 58, the information handling system wakes based upon the GPIO input map.

Figure 4:
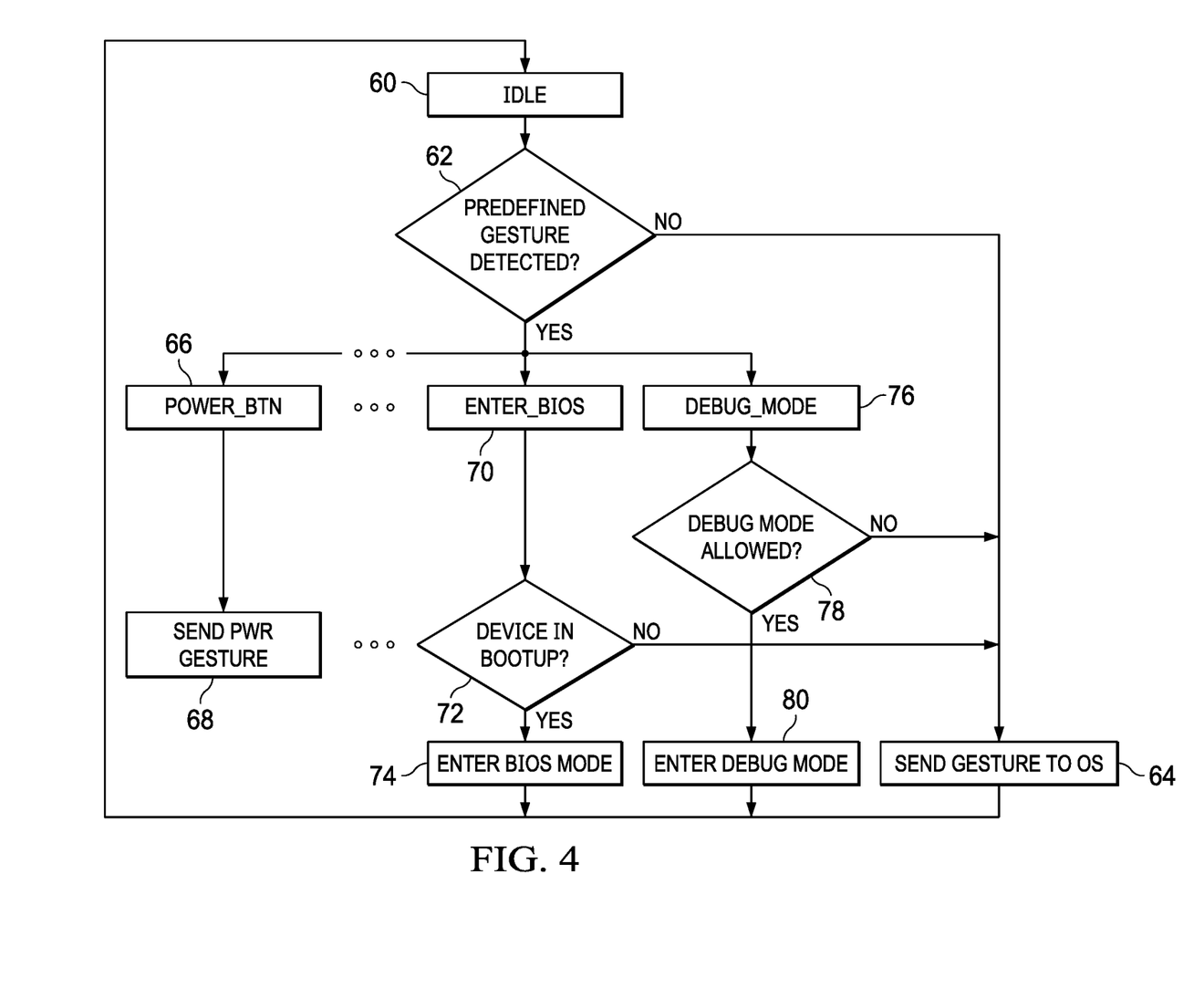
FIG. 4 depicts a flow diagram of a process for initiating a power transition based upon the type of touches detected by repurposed touch detection device.

Referring now to FIG. 4, a flow diagram depicts a process for initiating a power transition based upon the type of touches detected by repurposed touch detection device. The process starts at step 60 in an idle state, such as in a low power scan state searching for touches associated with an intent to transition from a low power quiescent state to a power up on state. At step 62, a determination is made of whether a predefined touch gesture is detected, such as a touch by a defined number of fingers for a defined time period. If a detected touch is not a predefined gesture and power is available at the system, the gesture is forwarded at step 64 to the operating system. If at step 62 the gesture is a predefined gesture, a determination is made of the type of gesture detected. If a power up transition gesture is detected, the process continues to step 66 to apply power button logic and to step 68 to send the power up gesture to a controller that commands a system power up.

In the example embodiment, two other types of power transition gestures are supported, a BIOS gesture and a debug mode gesture. If a BIOS gesture is detected, the process continues to step 70 to enter the BIOS mode. At step 72 a determination is made of whether the device is in a bootup mode and, if so, the process continues to step 64 for management by the operating system. If not, at step 74 the process enters BIOS mode. If the gesture at step 62 commands a debug mode, the process continues to step 76 to command entry of the debug mode. At step 78 a determination is made of whether a debug mode is allowed and, if not, the process continues to step 64 to allow the operating system to manage the gesture. At step 78 if the debug mode is allowed, the process continues to step 80 to enter the debug mode.

Figure 5:
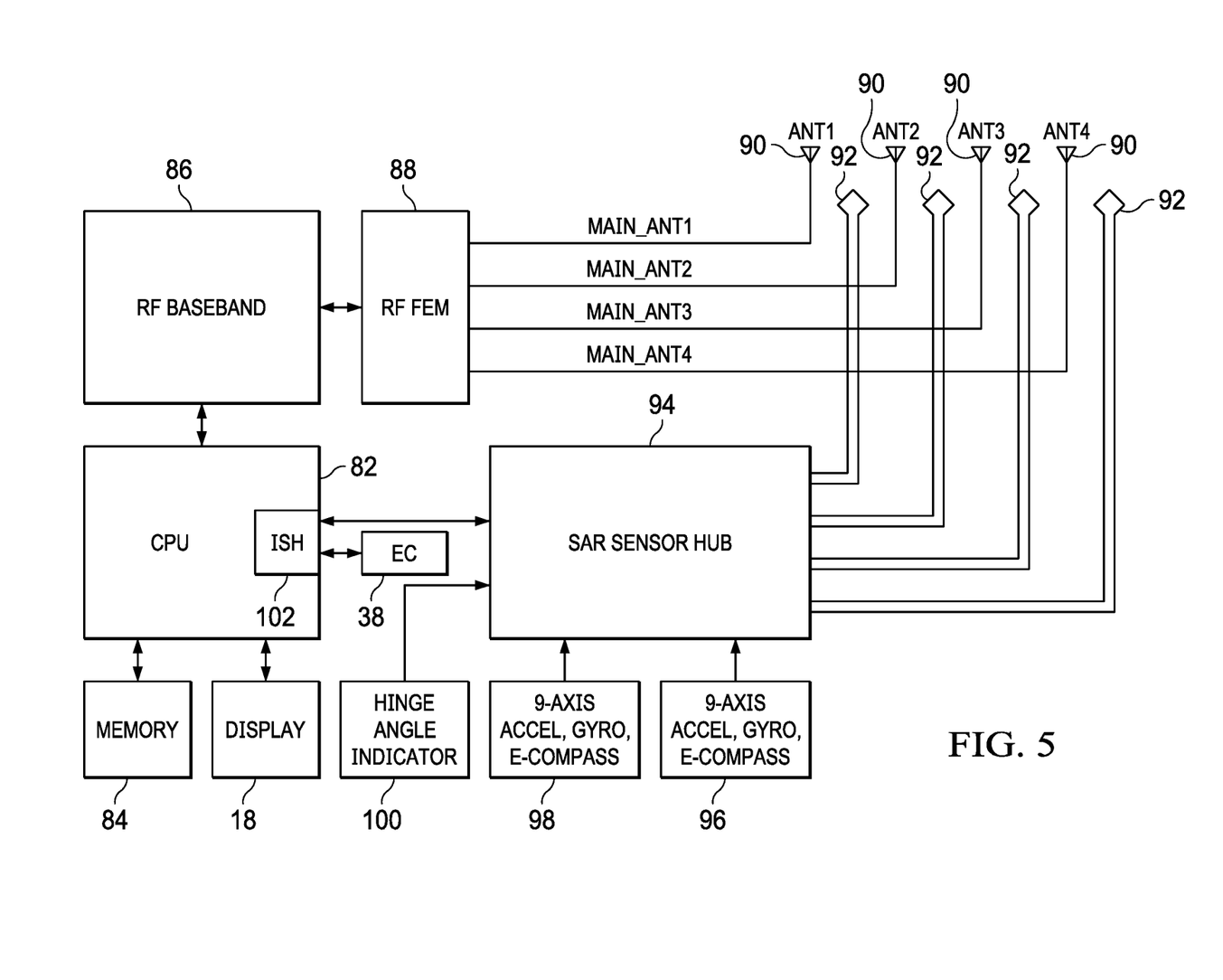
FIG. 5 depicts a block diagram of an example embodiment that uses SAR sensors to detect a power up command from a quiescent state.

Referring now to FIG. 5, a block diagram depicts an example embodiment that uses SAR sensors 92 to detect a power up command from a quiescent state. The example embodiment depicts a central processor unit (CPU) 82 that interfaces with a random access memory (RAM) 84 to execute instructions that process information for presentation at a touchscreen lid display 18. An embedded controller 38 interfaces with CPU 82 to manage power and other hardware interactions, such as inputs from input devices like a keyboard or touch detection device. CPU 82 interfaces with a radiofrequency baseband transceiver 86, which manages wireless signal communications, such as through a wireless local area network (WLAN) or wireless wide area network (WWAN). In the example embodiment, radiofrequency baseband transceiver 86 sends wireless signal through radiofrequency front end module, which switches the wireless signal as appropriate to one or more of an array of antenna 90. For instance, antenna 90 may be selected to transmit individually or in sets based upon available signal strength or other factors in a conventional manner. During transmission of wireless signals, a SAR sensor hub 94 interfaces with plural SAR sensors 92 to detect human proximity that might indicate a need to reduce wireless signal transmission strength. In the example embodiment, a variety of other sensors interface with SAR sensor hub 94 to aid in detection of an appropriate wireless signal transmission strength, such as a nine axis accelerometer, a gyroscope and an e-compass 96 and 98, and a hinge angle indicator 100.

In the example embodiment, SAR sensors 92 are repurposed at transition of information handling system 10 to a quiescent state to detect a power up transition command instead of human proximity to manage wireless signal transmission strength. In the repurposed mode, SAR sensors 92 may operate in a reduced power consumption mode, such as with a lower scan rate. Further, less than all of SAR sensors 92 may be used for power up command detection based upon the position of the SAR sensors. In the power up command detection mode, if a touch is detected for a predetermined time, the SAR sensor 92 that detects the touch sends an interrupt through SAR sensor hub 94 to an integrated sensor hub (ISH) 102 of CPU 82. ISH 102 and CPU 82 are in a quiescent state upon detection of the interrupt so that ISH 102 forwards the interrupt to embedded controller 38 to initiate the power up transition. Embedded controller 38 loads policy settings for the power up transition and detects the system state and then sends a customized scan code for configuration to the operating system at power up. Once power up transition is complete, the operating system applies the scan code at the applications and reconfigures SAR sensors 92 to detect human proximity in support of wireless transmission strength management.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions that process information;
   a memory disposed in the housing and interfaced with the processor, the memory operable to store the instructions and information;
   a controller interfaced with the processor and operable to manage a power state of the processor; and
   a component disposed in the housing and having a function, the component including a capacitive sensor to perform the function, the component having an operational state to perform the function and a quiescent state with the function disabled, the capacitive sensor in the quiescent state operable to detect a predetermined touch and in response to command the controller to transition the processor from a power down state to a power up state.

2. The information handling system of claim 1 wherein:
   the component comprises a touchscreen display integrated in the housing;
   the operational state performs touch input detection related to images presented at the touchscreen display; and
   the quiescent state predetermined touch comprises a touch at the touchscreen display for a predetermined time.

3. The information handling system of claim 2 wherein:
   the quiescent state sets a quiescent scan rate for detecting touches; and
   in response to the touch for the predetermined time, the capacitive sensor sets an active scan rate to monitor for a gesture associated with transition to a power up state.

4. The information handling system of claim 3 wherein the gesture comprises a three finger touch.

5. The information handling system of claim 1 wherein:
   the component comprises a specific absorption rate sensor;
   the operational state performs proximity sensing related to antenna transmissions; and
   the quiescent state predetermined touch comprises a touch proximate the antenna for a predetermined time.

6. The information handling system of claim 5 wherein in response to the touch proximate the antenna for a predetermined time a light emitting diode illuminates proximate the touch location.

7. The information handling system of claim 6 wherein a command to transition the processor to a power up state issues in response to a sliding motion relative to the light emitting diode.

8. The information handling system of claim 5 wherein:
   the housing further comprises first and second portions rotationally coupled by a hinge having a hinge cover; and
   the specific absorption rate sensor is disposed under the hinge cover.

9. The information handling system of claim 5 further comprising:
   first and second specific absorption rate sensors;

wherein a touch at one specific absorption rate sensor commands a first processor power up state and a touch at both specific rate absorption sensors commands a second processor power up state.

10. A method for managing power state transitions at an information handling system, the method comprising:
    detecting touches at the information handling system in an operational state with a capacitive touch detection device in a primary mode having a primary scan rate;
    powering down the information handling system to a power off state;
    in response to the powering down, configuring the capacitive detection device to detect touches in a secondary mode having a secondary scan rate; and
    transitioning the information handling system from the power off state to the operational state in response to a predetermined touch at the capacitive touch detection device for a predetermined amount of time.

11. The method of claim 10 wherein:
    the capacitive touch detection device comprises a touchscreen display; and
    the predetermined touch comprises plural finger touches in a predetermined pattern for the predetermined time.

12. The method of claim 11 further comprising:
    in response to the predetermined touch for the predetermined time, providing a visual indication at the touchscreen display; and
    performing the transitioning in response to a gesture of the predetermined touch, the gesture performed after the providing a visual indication.

13. The method of claim 12 wherein the gesture comprises a three finger swipe across the touchscreen display.

14. The method of claim 10 wherein:
    the capacitive touch detection device comprises a specific absorption rate sensor; and
    the predetermined touch comprises a finger touch proximate an antenna monitored by the specific absorption rate sensor.

15. The method of claim 14 further comprising:
    in response to predetermined touch for the predetermined time, illuminating a light proximate the antenna; and
    transitioning to the operational state in response to a gesture of sliding the touch toward the light.

16. The method of claim 15 wherein the specific absorption rate sensor and the antenna are disposed in a hinge that rotationally couples first and second housing portions to each other.

17. A system for power management of an information handling system comprising:
    an antenna configured to transmit wireless radio signals;
    a specific absorption rate sensor disposed proximate the antenna to detect human body proximity to the antenna for managing wireless signal transmission strength; and
    a controller interfaced with the specific absorption rate sensor, the controller scanning the specific absorption rate sensor at a first rate to manage wireless signal strength and at a second rate to detect a power on command, the controller applying the second rate in response to a power off state at the information handling system.

18. The system of claim 17 wherein the controller detects a power on command as a touch lasting at least a predetermined time.

19. The system of claim 17 further comprising:
    first and second specific absorption rate sensors disposed proximate first and second antenna;
    wherein the controller detects a power on command as a touch as simultaneous touches lasting a predetermined time at both the first and second specific absorption rate sensors.

20. The system of claim 17 wherein the specific absorption rate sensor is disposed in a hinge assembly of the information handling system.

* * * * *